(12) United States Patent
Rabe et al.

(10) Patent No.: US 8,239,584 B1
(45) Date of Patent: Aug. 7, 2012

(54) TECHNIQUES FOR AUTOMATED STORAGE MANAGEMENT

(75) Inventors: Bruce R. Rabe, Dedham, MA (US); Mark A Parenti, Milford, NH (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 12/928,661

(22) Filed: Dec. 16, 2010

(51) Int. Cl.
G06F 3/00 (2006.01)
G06F 13/00 (2006.01)

(52) U.S. Cl. ............................................. 710/8; 711/170
(58) Field of Classification Search ........ 710/8; 711/170
See application file for complete search history.

(56) References Cited

U.S. PATENT DOCUMENTS

| | | | |
|---|---|---|---|
| 7,043,619 B1 * | 5/2006 | Knight | 711/170 |
| 7,523,231 B1 | 4/2009 | Gupta et al. | |
| 7,822,939 B1 | 10/2010 | Veprinsky et al. | |
| 7,904,652 B1 | 3/2011 | Castelli et al. | |
| 7,930,476 B1 * | 4/2011 | Castelli et al. | 711/114 |
| 7,984,200 B1 * | 7/2011 | Bombet et al. | 710/8 |
| 8,082,330 B1 | 12/2011 | Castelli et al. | |
| 2005/0216759 A1 * | 9/2005 | Rothman et al. | 713/200 |
| 2009/0070541 A1 | 3/2009 | Yochai | |
| 2010/0325345 A1 * | 12/2010 | Ohno et al. | 711/103 |

OTHER PUBLICATIONS

"EMC Tiered Storage for Microsoft Exchange 2010 Enabled by EMC Celerra Unified Storage", Jun. 2010, www.emc.com.

* cited by examiner

*Primary Examiner* — Hyun Nam
(74) *Attorney, Agent, or Firm* — Muirhead and Saturnelli, LLC

(57) ABSTRACT

Described are techniques for performing automated data storage configuration. A plurality of I/O operations are received on a data path. The I/O operations are analyzed and analysis information is determined. In accordance with the analysis information, an application which issued the plurality of I/O operations is determined. One or more configuration options are determined which are customized in accordance with the application. A portion of data storage in a data storage system is configured for use by the application in accordance with the one or more configuration options.

20 Claims, 13 Drawing Sheets

TECHNIQUES FOR AUTOMATED STORAGE MANAGEMENT

BACKGROUND

1. Technical Field

This application generally relates to data storage systems, and more particularly to techniques used in connection with management of data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Different tasks may be performed in connection with a data storage system. For example, a customer may perform data storage configuration and provisioning tasks. Such tasks may include, for example, configuring and provisioning storage for use with an email application. Tasks may include allocating storage, specifying the logical and/or physical devices used for the storage allocation, specifying whether the data should be replicated, the particular RAID (Redundant Array of Independent or Inexpensive Disks) level, and the like. With such options in connection with performing configuration and provisioning tasks, a customer may not have the appropriate level of sophistication and knowledge needed.

Thus, it may be desirable to utilize a flexible technique which assists customers in connection with performing data storage management tasks such as related to data storage configuration and provisioning. It may be desirable that the techniques be automated and perform data storage configuration and other management tasks in accordance with best practices that may vary with the underlying data storage system and/or application.

SUMMARY OF THE INVENTION

In accordance with one aspect of the invention is a method for performing automated data storage configuration comprising: receiving a plurality of I/O operations on a data path; analyzing the plurality of I/O operations and determining analysis information; determining, in accordance with the analysis information, an application which issued the plurality of I/O operations; determining one or more configuration options customized in accordance with the application; and configuring a portion of data storage in a data storage system for use by the application in accordance with the one or more configuration options. The method may also include selecting an application profile of customized configuration options for the application based on the analysis information, wherein said application profile includes said one or more configuration options used in said configuring. Each of the plurality of I/O operations may include hint information, the hint information including information identifying said application. The hint information may include a window of time indicating when said application is expected to perform I/O activity identified in the hint information. The hint information may include information characterizing data of said each I/O operation. The hint information may include any of a type of data, a security indicator, a data sensitivity indicator, and a data usage indicator. The application profile includes information identifying one or more customized configuration options including any of a RAID protection level, a RAID layout configuration including a number of data members and parity members, one or more data storage tiers to be used in connection with storing data for the application, an indicator as to whether data for the application may be automatically migrated between storage tiers, an indicator as to whether to data for the application is stored on a thin device, an indicator as to whether to perform compression when storing data of the application, an indicator as to whether to perform encryption when storing data of the application, and an indicator as to whether to perform deduplication when storing data of the application. The application profile may include information regarding data protection and may indicate any one or more of a protection schedule and a technology for providing data protection. The technology for providing data protection may include any of a snapshot, device cloning or replication, and remote data replication. The method may further include determining, for a defined time period, one or more metrics regarding said plurality of I/O operations; determining, in accordance with said one or more metrics, an observed I/O pattern; and determining that said application issued the plurality of I/O operations based on the observed I/O pattern. The observed I/O pattern may match a predetermined I/O pattern expected for the application. The one or more metrics may include any of a total number of I/O operations/time period, a number of read operations/time period, a number of write operations/time period, a ratio of read to write operations, an average size of an I/O operation determined for a time period, an average size of a read operation determined for a time period, and an average size of a write operation determined for a time period. The method may be performed by code executing in the data storage system without any user interaction. Hint information may be sent to the data storage system over a control path in a data storage configuration command, said hint information including information identifying a second application, a portion of data storage to which the hint information applies, a target window of time as to when the hint information applies, a hint classification, and hint details. The hint classification may identify an expected workload and the hint details identifying workload characteristics including any of type of I/O operation and expected intensity level.

In accordance with another aspect of the invention is a computer readable medium comprising code stored thereon for performing automated data storage configuration, the computer readable medium comprising code, which when executed, performs a method comprising: receiving a plurality of I/O operations on a data path; analyzing said plurality of I/O operations and determining analysis information; determining one or more configuration options customized in accordance with the analysis information; and configuring a portion of data storage in a data storage system for use in accordance with the one or more configuration options. The method may further comprise determining, for a defined time period, one or more metrics regarding said plurality of I/O operations; determining, in accordance with said one or more metrics, an observed I/O pattern in accordance with one or more of an I/O operation type, an I/O operation frequency, and an I/O operation size; and determining said one or more configuration options based on the observed I/O pattern. The one or more configuration options may include any of a RAID protection level, a RAID layout configuration including a number of data members and parity members, one or more data storage tiers to be used in connection with storing data used in connection with the plurality of I/O operations.

In accordance with another aspect of the invention is a method for performing automated data storage configuration comprising: receiving a plurality of I/O operations on a data path; analyzing said plurality of I/O operations and determining analysis information; determining, in accordance with said analysis information, an application which issued the plurality of I/O operations; determining one or more configuration options customized in accordance with the application; and performing, in accordance with the one or more configuration options, an action in connection with data storage configuration. The action may include any of configuring a portion of data storage in a data storage system for use by the application in accordance with the one or more configuration options, providing one or more input parameters to a software module that performs automated storage tiering management including data migration between different defined storage tiers, creating a data protection schedule using a data protection service identified in the one or more configuration options.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
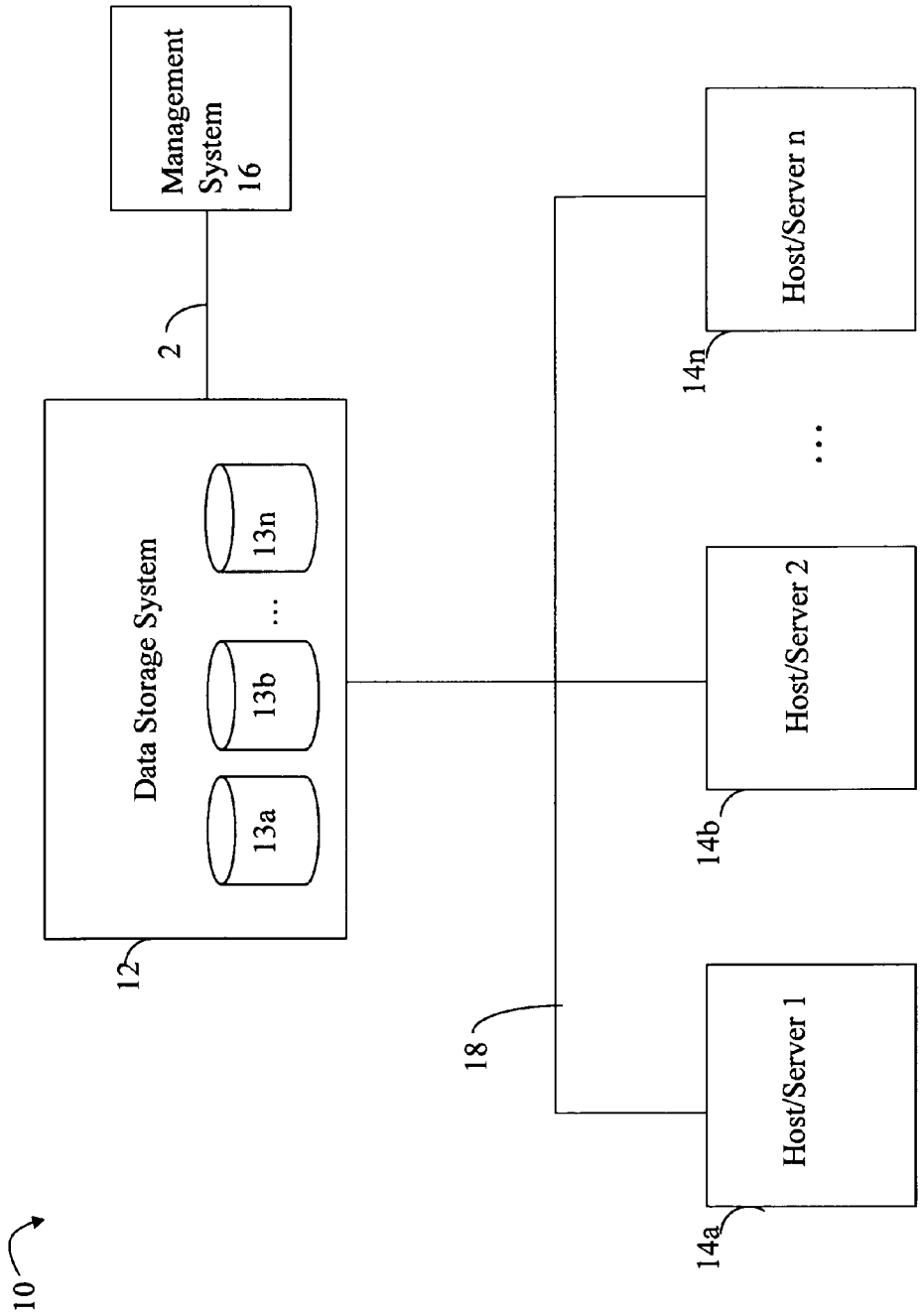
FIG. 1 is an example of an embodiment of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
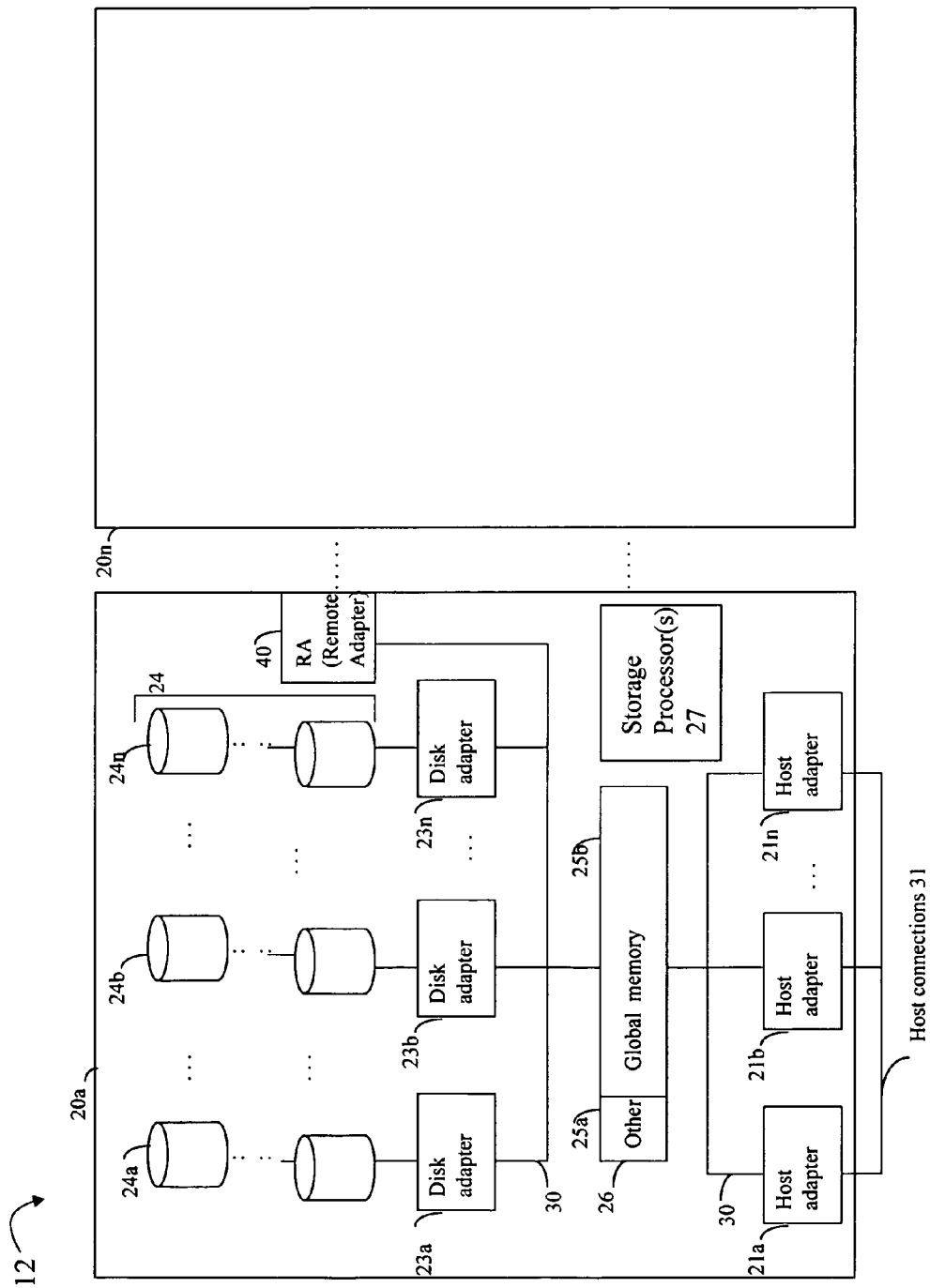
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the CLARiiON® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Described in following paragraphs are techniques that may be used in connection with performing automated storage management without user interactions. In one embodiment in accordance with techniques herein, no user interaction is needed in connection with physical storage device configuration for use, for example, into storage pools, RAID groups, LUNs, and the like. Such processing may be performed automatically with respect to physical devices at initial data storage configuration or as additional device may be added at a later point in time. Techniques herein may also provide for automatically reconfiguring existing storage as needs of the applications using the storage change, adding storage of appropriate configurations (e.g., selected RAID level and layout, selected physical device types and/or storage tiers based on the application and/or detected I/O patterns) to existing storage pools, creating new and additional storage pools, and the like.

Before describing such techniques, reference is made to an initial discussion of how physical storage devices may be configured for use by an application in one embodiment. In such an embodiment, physical devices may be configured into one or more storage pools although an embodiment may or may not utilize storage pools, RAID groups and/or other logical entities described herein.

The physical storage devices of the data storage system may be configured or partitioned into storage pools. An embodiment may form one or more such storage pools for use in connection with servicing a provisioning request prior to the issuance of the provisioning request. In other words, the physical storage devices may be configured into one or more storage pools at a first point in time. At a second later point in time, storage may be allocated from the previously formed storage pools in connection with a provisioning request to allocate storage for use with an application hosting data on the data storage system. As will be described in more detail herein, storage pools may be formed at different points in time in connection with the life cycle of a data storage system. For example, storage pools may be formed as part of data storage system initialization and startup processing and when new data storage devices are added to a data storage system. An embodiment may also form storage pools from only a portion of storage devices at a first point in time and then later configure additional storage devices. Additionally, an embodiment may also reconfigure storage devices. For example, a first physical device may initially be configured for use in a first storage pool. At a later point in time, the first physical device may be reconfigured for use with a second storage pool. Examples of the foregoing and different variations of how and when storage pools may be formed are described in more detail herein.

Figure 3:
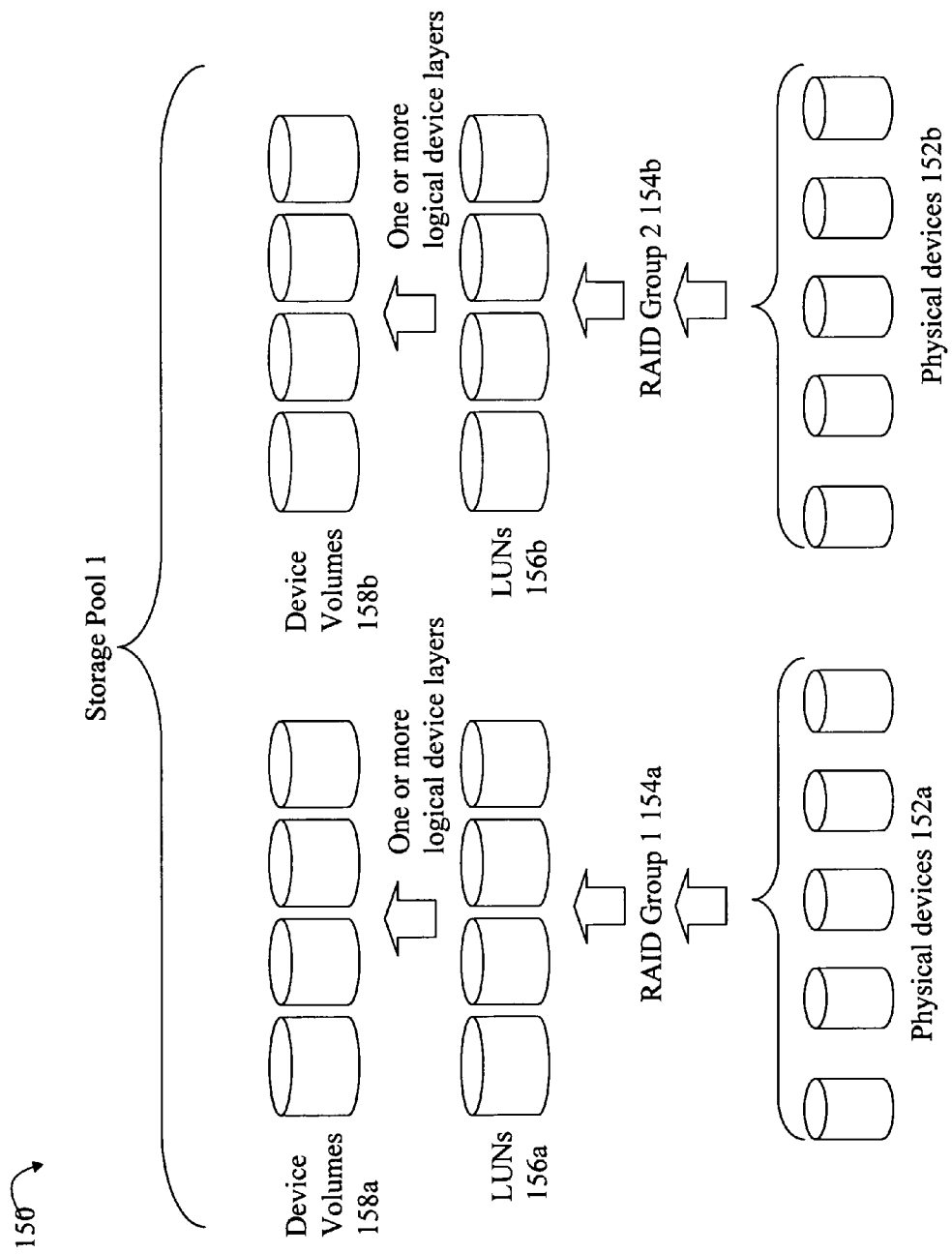
FIG. 3 is an example illustrating how storage pools may be configured in an embodiment in accordance with techniques herein.

Referring to FIG. 3, shown is an example representing how storage pools may be formed from physical devices in an embodiment in accordance with techniques herein. The example 150 illustrates how storage pools may be constructed from groups of physical devices. For example, RAID Group1 154a may be formed from physical devices 152a. A storage pool may have a particular RAID level and RAID configuration or layout for the type of storage pool being formed. For example, for physical devices 152a on a first data storage system type when forming a FAST storage pool, RAID-5 may be used in a 4+1 configuration (e.g., 4 data drives and 1 parity drive). The RAID Group 1 154a may provide a number of data storage LUNs 156a. An embodiment may also utilize one or more additional logical device layers on top of the LUNs 156a to form one or more logical device volumes 158a. The particular additional logical device layers used, if any, may vary with the data storage system. It should be noted that there may not be a 1-1 correspondence between the LUNs of 156a and the volumes of 158a. In a similar manner, device volumes 158b may be formed or configured from physical devices 152b. The storage pool 1 of the example 150 illustrates two RAID groups being used to define a single storage pool although, more generally, one or more RAID groups may be used for form a storage pool in an embodiment using RAID techniques.

For purposes of illustration in an example that will now be described, the storage pools used in connection with storing data for an application may be formed, for example, as part of an initial configuration (e.g., such as when the data storage system first is brought online for use). However, as will also be described in more detail elsewhere herein, processing performed to configure physical devices into storage pools may be performed at other points in time.

In one embodiment in accordance with techniques herein, the physical devices of the data storage system may be automatically configured using a first set of default configuration options. In accordance with techniques herein, the data storage configuration may be automatically modified over time in accordance with the particular applications that use the data storage system. As will be described in more detail below, the initial configuration may be automatically modified for use by the applications based on data storage configuration options selected in accordance with application best practices. For example, an existing storage pool may be modified and/or a new storage pool may be added to use a RAID group have a RAID level and/or layout (e.g., number of parity and data devices) based on the particular application(s) having data stored in the storage pool. If the application's data is already stored on an existing drive of a first storage pool, a second new storage pool may be created having the RAID configuration customized for the application's data. The application data may then be automatically migrated from the first storage pool to the second storage pool. All of the foregoing may be performed automatically without user interaction and without disruption to the executing application. The foregoing is merely one exemplary use of the techniques herein which may provide for automated data storage management.

The techniques herein that may be used to assist customers of a data storage system in connection with performing data storage system management tasks such as related to data storage system configuration, provisioning of data storage, and the like. The techniques are flexible and allow for implementation of best practices and defaults in an automated fashion which may be customized for the particular application and/or data storage system.

The application best practices used in an embodiment may be determined based on experience, know how, testing and the like, in connection with provisioning storage for a particular application. Application specific best practices may be characterized as one or more configuration options customized for use with data storage for the particular application. To illustrate, the configuration options used for configuring data storage for use with an application may vary with a particular email application, database application, and the like. The application best practices may be codified in accordance with techniques herein to provide for automatically performing many data storage management tasks including, for example, provisioning data storage system resources, selecting and implementing data protection services including a backup schedule, and the like. An embodiment utilizing the techniques herein may implement the application best practices using executable code which is executed on the data storage system. The application best practices may provide for selection of data storage configuration options which may be automatically implemented. Thus, the selection and implementation of such options may be performed in automated way so that a user does not have to monitor the state of the data storage system configuration and/or interact with the data storage system for such management. The data storage configuration options may be applicable at a LUN and/or storage pool level that may vary with embodiment. As set forth below, the techniques herein may be used to analyze the I/Os received on an I/O or data path to determine an associated I/O pattern, select an application having the associated I/O pattern detected, and determine one or more configuration options customized for the application. The techniques herein may be used to analyze the I/Os received on a data path, extract hint information included in the I/Os, determine an application using the hint information, and determine one or more configuration options customized for the application. Additionally, the techniques herein may be used to analyze the I/Os received on a data path to determine an associated I/O pattern, and determine one or more configuration options customized for the I/O pattern. Furthermore, the techniques herein may be used to receive one or more commands on a control path, extract hint information included in the commands, determine an application and/or other information about a set of data using the hint information, and determine one or more configuration options customized for the application and/or set of data. An embodiment in accordance with techniques herein may perform one or more of the foregoing in connection with automated data storage management.

In accordance with one aspect, a data path or I/O path may generally refer to the logical and/or physical path over which an I/O is transmitted such as from a host or other client to the data storage system. The I/O path may include the runtime execution call chain or stack traversed on the data storage system when processing the I/O operation, such as a read or write to a LUN. A control path may generally refer to the logical and/or physical path over which a management or control command is transmitted, such as from a management system and/or host, to a data storage system. The control path may include the runtime execution call chain or stack traversed on the data storage system when processing the control command. In an embodiment in accordance with techniques herein, the control command may be automatically generated, such as by a management software agent and/or other software residing on the sending or initiating system. Hint information included in commands sent over the control path may be automatically determined by executing software such as, for example, the agent and/or an application storing data on the data storage system. In an embodiment described below, the hint information may identify an application and/or other information about a data set. For example, the agent and/or accounting application may know that the accounting application will perform certain activities at the end of each month which will greatly increase I/O activity on the accounting application's storage devices for a 24-hour period. Such information regarding the accounting application and its increased I/O activity may be obtained in any one or more different ways (e.g., based on actual/observed historic I/O activity from prior months, based on usage information reported by the accounting application to the agent, and the like). From this information, for example, the agent may generate the control command including the hint information.

As mentioned above, customization of storage configuration options may be based on I/O patterns detected through observing or monitoring I/O activity. For example, the data storage system may determine one or more I/O performance metrics derived from observing I/O activity directed to a LUN. The performance metrics may provide an I/O activity profile or workload for the LUN. The performance metrics may include, for example, one or more of I/O throughput or frequency (e.g., total number of I/Os per unit of time), frequency of read operations (e.g., reads/second or other unit of time), frequency of write operations (e.g., write/second or other unit of time), ratio of read to write operations, average size of I/Os (e.g., average size such as in bytes of read operations, write operations, read and writes in combination), an amount of I/O operations (e.g., reads, writes, or combination of reads and writes) which are sequential and/or random, and the like. An I/O pattern may include one or more of the foregoing metrics. Additionally, an I/O pattern may also include an observed sequence of one or more I/O operations. For example, consider a database application. The application may perform one or more I/O operations to a first LUN storing the database data followed by a write operation to a second LUN upon which the database transaction log is stored. The write to the transaction log may always be a particular size. As such, the I/O pattern which is characteristic or signature of the database application may include 100% sequential writes of the particular size to the second LUN. Additionally, the I/O pattern includes the sequence of I/O operations where the writes to the second LUN for the log are interspersed between other I/O operations to the first LUN.

Based on the foregoing, an observed I/O pattern may be compared to a set of predetermined or known I/O patterns defining characteristic, expected I/O patterns for applications. A determination may be made as to whether the observed I/O pattern matches, or is similar, to an expected I/O pattern for an application. If so, then it may be determined that the application is issuing the I/Os of the observed I/O pattern. As also described herein, even if no match is made with respect to an expected I/O pattern for an application, an embodiment may determine one or more configuration options based on the observed I/O pattern.

Figure 4:
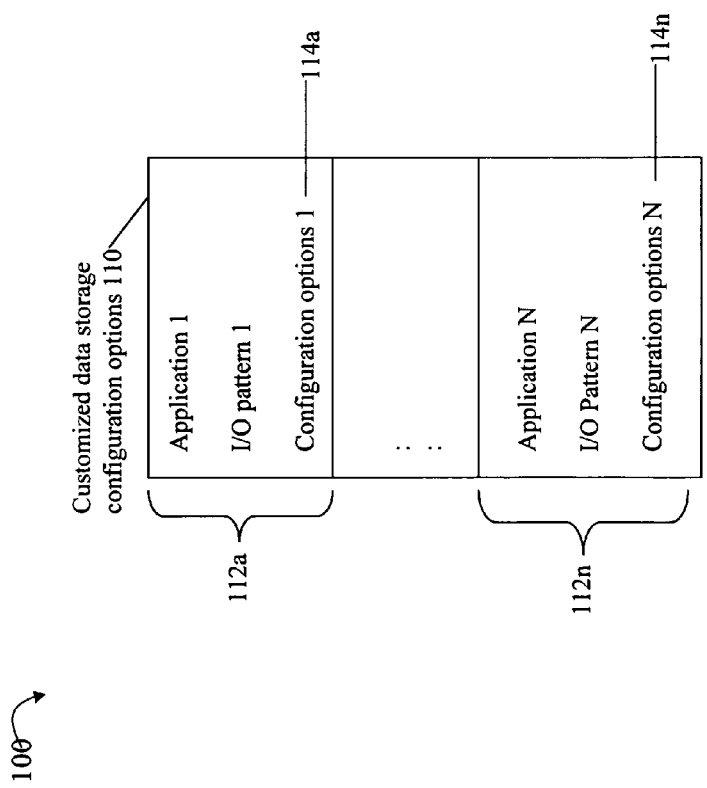
FIGS. 4, 5, and 6 are examples illustrating I/O patterns and configuration options that may be specified for one or more applications in an embodiment in accordance with techniques herein.

Referring to FIG. 4, shown is an example of information that may be used in an embodiment in accordance with techniques herein. The example 100 includes customized data storage configuration options 110 for N applications. Each of the N applications (N>0, denoted as 112a ... 112n) may have a corresponding record or entry in 110. Table 110 may also be referred to as application profile information including an instance for each application. Entry 112a identifies an application (e.g., Application 1), an expected I/O pattern (e.g., I/O pattern 1), and a set of one or more configuration options (e.g., configuration options 1) customized for the application in accordance with application best practices. In a similar manner, each entry of 110 may include information for a different one of the N applications.

Figure 5:
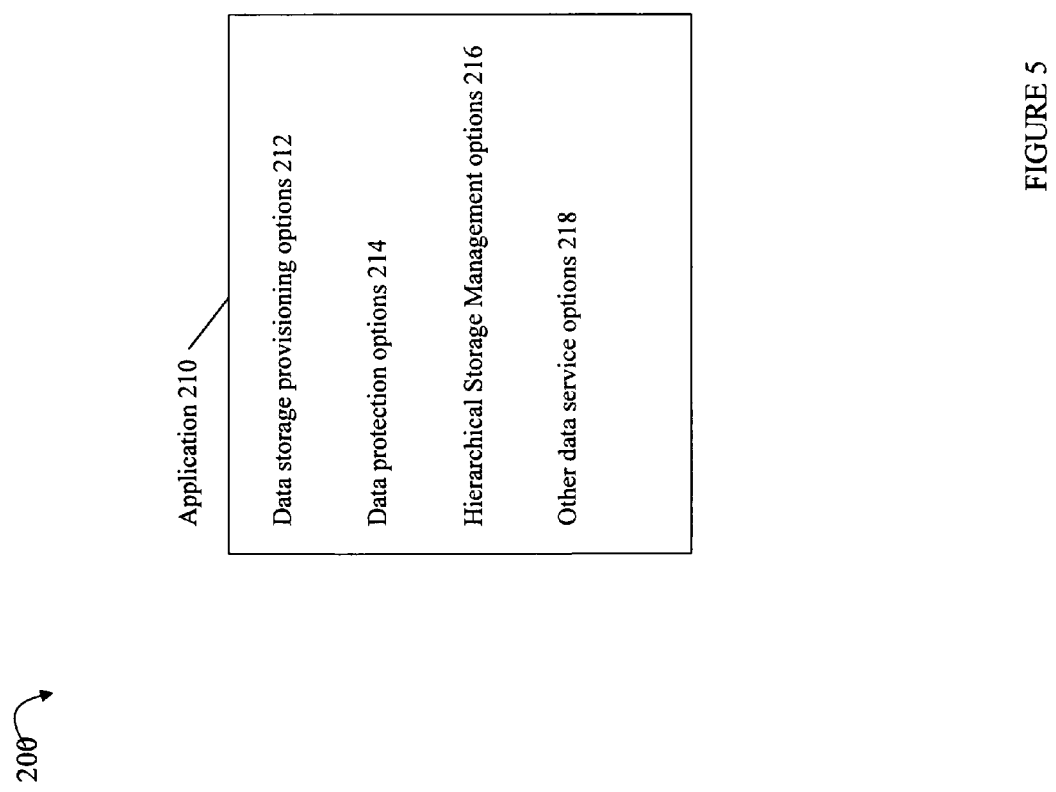

Referring to FIG. 5, shown is an example of categories of customized configuration options that may be used in connection with an application in accordance with techniques herein. The example 200 illustrates exemplary configuration options for data services that may be used in connection with an application 210 where the options are customized or selected for the particular application 210. Options described in connection with element 210 may be specified for each entry and associated application represented by 110 of FIG. 4. Such options may be specified, for example, in connection with 114a or 114n of FIG. 4.

Generally, data services may include any service that transforms or utilizes the data and/or the storage of the data. In connection with an embodiment herein, the data services may be applicable at the LUN and/or storage pool level. Exemplary categories of data services may include data storage capacity or provisioning, data protection, hierarchical storage management and other data service options. Configuration options selected or customized for the application 210 are represented for each of the foregoing categories in the example 200 where the configuration options may include data storage capacity or provisioning options 212, data protection options 214, hierarchical storage management options 216 and other data service options 218.

Storage capacity/provisioning data services may include services to configure and allocate storage for use by the application. Examples of options 212 may specify, for example, a particular RAID protection level (e.g., RAID 0, 1, 2, 5, 6, 10, etc.), a particular RAID layout (e.g., for a particular RAID level such as RAID-5, a number of data drives and parity drives), a minimum amount of storage in a storage pool or LUN, a preferred storage category such as an attribute of a storage pool or a LUN, and the like. As another example of a storage pool attribute or property, a storage category for a storage pool may indicate whether to store application data in a CHEAP or FAST storage pool. CHEAP and FAST may be possible abstractly defined storage pool attributes. FAST storage may be defined as a general category of "fast" storage based on one or more different data storage system-specific properties which are used to characterize the storage pool. The particular properties and associated values used to define a FAST storage pool as well as other storage pools may vary with the underlying data storage system. As with FAST storage pools, CHEAP may be an abstract property based on one or more data storage specific properties and values that vary with the underlying data storage system. The particular properties and values used to characterize and define a CHEAP storage pool may vary with data storage system. CHEAP may refer to a second type of data storage which may be characterized as inexpensive and not as fast in connection with servicing I/O requests relative to the storage pools of type FAST. In contrast to CHEAP storage pools, storage pools of type FAST may consist of faster device types and device configurations which may typically result in faster I/O request service times. Other embodiments may use a different number and different types or categories of storage pools other than FAST and CHEAP. To further illustrate, a first storage pool may have the FAST attribute and may be defined as using Fibre Channel drives in a RAID-10 configuration of device pairs. A second storage pool may have the FAST attribute and may be defined as using Fibre channel drives with a RAID-5 (4 data drives+1 parity drive) configuration. A third storage pool may have the CHEAP attribute and be defined as using ATA drives with a RAID-5 (8 data drives and 1 parity drive) configuration. In accordance with techniques herein, configuration options of 212 may identify the particular RAID level and/or physical drive characteristics associated with a LUN and/or storage pool. The options of 212 may also identify an abstractly defined type such as CHEAP and/or FAST associated with a storage pool.

Data protection services may include, for example, providing data backups, encryption services, data replication (local in same data storage system and/or remote at another physically remote data storage system), and the like. Example options of 214 may indicate whether to perform encryption, whether to perform a data backup and if so options for a backup schedule (e.g., frequency of backups, whether backups are complete, partial or differential), whether to perform local data replication in the same data storage system, whether to perform remote data replication such as using a form of RDF (remote data facility) as offered by EMC Corporation of Hopkinton, Mass., and the like.

Hierarchical storage management services may provide services for managing the storage devices in an embodiment which includes multiple tiers and/or types of data storage. Hierarchical storage management services may include, for example, moving data between different types of data storage devices such as between a fibre-channel data storage disk and an ATA (Advanced Technology Attachment) disk, between one of the foregoing disks and a tape, between different defined storage tiers, and the like. In connection with hierarchical storage management configuration options, an embodiment may indicate whether or not to utilize such services. If such services are used, the options 216 may indicate options customized for the particular application. For example, one embodiment of a data storage system may provide for different defined storage tiers. Software that may be used in connection with performing hierarchical storage management is, for example, a Fully Automated Storage Tiering (FAST) product by EMC Corporation of Hopkinton, Mass., that provides for the optimization and use of different storage tiers including the ability to easily create and apply tiering policies to transparently automate the control, placement, and movement of data within a storage system based on business needs. Each tier may generally include physical storage devices or drives having one or more attributes associated with a definition for that tier. For example, an embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive, and the like. Data protection may specify a type or level of data storage protection such, for example, as a particular RAID level (e.g., RAID1, RAID-5 3+1, RAID5 7+1, and the like). Performance characteristics may relate to different performance aspects of the physical storage devices of a particular type or technology. For example, there may be multiple types of magnetic disk or spinning media type of FC drives based on the RPM characteristics of the FC drives (e.g., 10K RPM FC drives and 15K RPM FC drives) and FC drives having different RPM characteristics may be included in different storage tiers. Storage capacity may specify the amount of data, such as in bytes, that may be stored on the drives. An embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC drives which are a type of magnetic disk or other spinning media type, and a third tier of all SATA (Serial Advanced Technology Attachment) drives which are a type of magnetic disk or other spinning media type. The foregoing are some examples of tier definitions and other tier definitions may be specified. In such an embodiment having different storage tiers, the services associated with hierarchical storage management may provide for movement of data between storage tiers such as based on one or more I/O rate metrics (e.g., store data which has a high rate of I/O access to an SSD tier and store other data have a relatively lower I/O rate to another storage tier having slower driver performance characteristics). For example, an application's data stored on a LUN may be migrated from devices of a first storage tier to other devices of another tier having the same or similar attributes and performance characteristics, or to other devices of another tier having different attributes and performance characteristics depending on the purpose of the migration. Example options of 216 may include an indication as to whether storage of the application may be automatically migrated at all (e.g., disable automatic migration) or may indicate varying degrees of allowable automatic migration such as whether data of the application may be migrated between storage tiers, to another device of a same or similar storage tier (e.g., having similar performance characteristic and attributes), identify what one or more storage tiers in which data for the application may be located, and the like.

Other examples of services that may be included in an embodiment are data de-duplication techniques, thin devices, retention services which focus on preventing deleting data until a certain time period and/or automated deletion of data after a specified time period, and classification services which may index content as stored to allow for other operations such as retrieval of content based on subsequent search criteria, categorization of data content, and the like. In connection with the foregoing, data de-duplication may generally refer to techniques which attempt to reduce or eliminate redundantly storing a same portion of data. In connection with a thin device, not all portions of the thin device's logical storage space may be associated with physical storage. A thin device presents a logical storage space to one or more applications running on a host where different portions of the logical storage space may or may not have corresponding physical storage space associated therewith. Thus, an access of the logical storage space of the thin device results in either a null pointer (or equivalent) indicating that no corresponding physical storage space has yet been allocated, or results in a reference to a data device which in turn references the underlying physical storage space. With thin devices having a logical storage space/range, associated physical storage may not be allocated for the entire logical storage space when created. Rather, portions of physical storage may be allocated/deallocated and mapped/unmapped with respect to the thin device's logical storage space as needed.

Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. patent application Ser. No. 11/903,869, filed Sep. 25, 2007, DATA DE-DUPLICATION USING THIN PROVISIONING, Veprinsky et al., EMS-177US, both of which are incorporated by reference herein.

Example applications for 210 may include, for example, an email application, a database application, a banking application, a law office application, a medical office application, and the like. Other data services, as a category or included in a broader data service category, may provide for snapshots, cloning, migration, recovery, and the like.

It should be noted that application 210 may refer to a particular application category including one or more applications. For example, 210 may refer to email applications as a category including multiple email applications from different vendors. However, 210 may also be associated with a particular instance of an email application, such as Microsoft Exchange.

Figure 6:
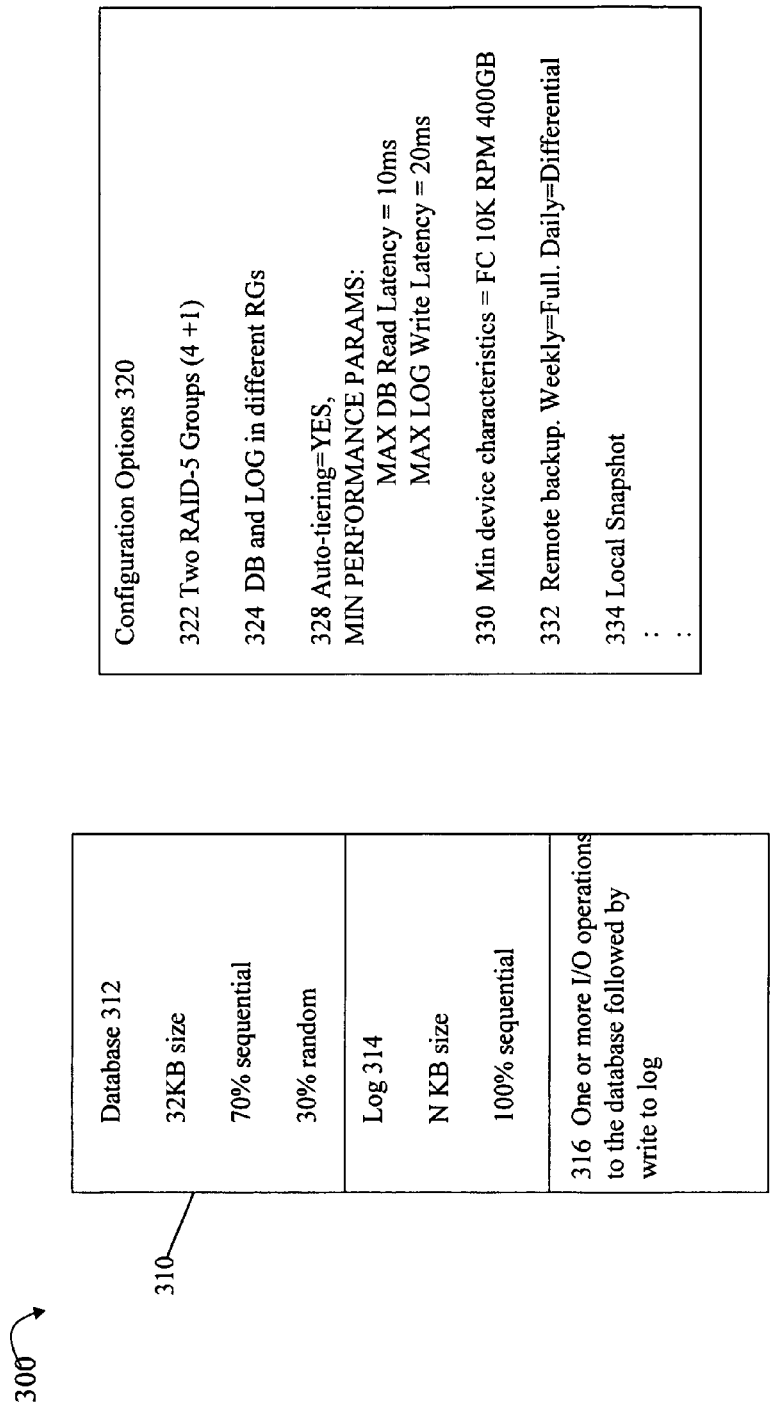

Referring to FIG. 6, shown is an example of expected I/O patterns and configuration options for an email application as may be used in an embodiment in accordance with techniques herein.

The example 300 includes expected I/O patterns 310 for an email application. As known in the art, the email application may use a database to write user data (e.g., email content data) and a log in connection with logging transaction with respect to the database. Element 312 identifies characteristics of the expected I/O pattern for the email application with respect to the database and may include I/O operations having a 32 KB size of which 70% are sequential and 30% are random. Element 314 identifies characteristics of the expected I/O pattern for the email application with respect to the log and may include write operations having an "N" KB size which are 100% sequential. Element 316 may indicate that a typical sequence of I/O operations for the email application includes one or more I/O operations to the database followed by a write to the log. It should be noted that in connection with the foregoing and other I/O characteristics of an application, characteristics which are I/O metrics are typical and may be approximate so that when determining whether observed or measured I/O metrics obtained in real-time (e.g., when monitoring I/O operations performed at the data storage system) match or correspond to those of a particular application, an embodiment may use thresholds or ranges as may be appropriate. For example, with reference to 312, approximately 70% of the I/O operations are expected to be sequential and approximately 30% of the I/O operations are expected to be random. An embodiment may specify a range for each of the foregoing when determining whether observed I/Os have a profile matching that of 312. In contrast, ranges may not be suitable for use with other values included in 310. For example, the database I/Os of 312 may only be 32 KB in size, and the log 314 may be expected to be write only with only sequential access as indicated by the 100%.

If processing determines that the observed or actual I/O pattern matches that of 310, an embodiment may select and utilize a corresponding set of configuration options 320 customized for the email application. The options 320 may indicate for the email application data storage configuration to use two RAID-5 groups having 4 data members and 1 parity member (322), store the database and log data in different RAID groups (324), and to perform automated storage tiering may be performed (328) allowing the system to automatically migrate or otherwise move email application data, for example, between devices of different storage pools having the same or different storage tiers in a multi-storage tiered environment. Also indicated by 328 are input parameters that may be used by the software performing the automated storage tiering and associated processing such as data migration. The MIN PERFORMANCE PARAMS indicate minimum performance values that the software may use in connection with performing the automated storage tiering. For the email application, the email application database and log are required to have a maximum database (DB) latency of 10 ms (average) and a maximum log write latency (average) of 20 ms. The automated storage tiering software may use the foregoing minimum performance parameters as criteria in connection with automatically configuring and/or reconfiguring what physical devices include the email application database and log data. Element 330 includes other information that may also be input to the automated storage tiering software and includes minimum device characteristics. A storage tier selected for the email database and log data has at least these performance characteristics of 330. A storage iter may be selected in which each physical device is an FC drive having a speed of at least 10K RPM and a minimum capacity of 400 GB. It should be noted that a storage tier may be selected if it includes devices having the minimum capacity and performance characteristics which are generally considered higher performing than those of FC disk devices. For example, a storage tier may be selected for storing the email application data if the storage tier includes FC disks with 15K RPM, if the storage tier includes SSDs, and the like. Element 332 indicates that remote backup is performed for the email application data with full weekly backups and daily differential or incremental backups. Element 334 indicates that local snapshots are made of the email data on the data storage system. Element 334 may also indicate other snapshot-specific parameters. The foregoing as well as other information may be included in customized configuration options 320 for the email application.

It should be noted that the determination regarding correspondence between observed and expected I/O activity may be made with respect to a single LUN or other unit of storage to which I/O operations may be directed.

Figure 7:
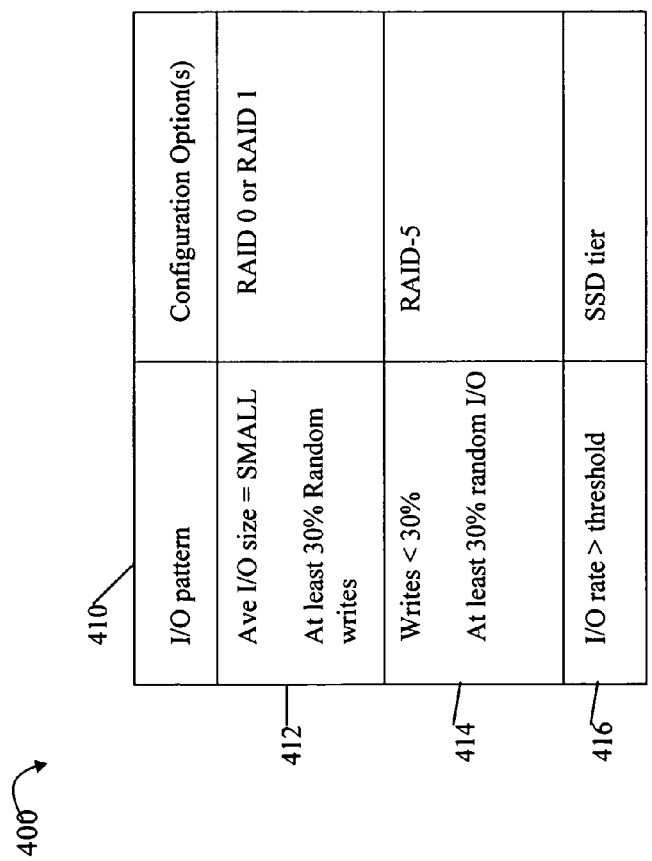
FIG. 7 is an example illustrating I/O patterns and associated configuration options that may be used in an embodiment in accordance with techniques herein.

Referring to FIG. 7, shown is an example of information that may be used in connection with techniques herein to determined configuration options for observed I/O patterns. As noted above, if a match cannot be made between an observed I/O pattern and an expected predetermined I/O pattern for an application, an embodiment may determine correspondence between the observed I/O pattern and a predetermined I/O pattern that is not associated with an application. Based on this matching, one or more configuration options may be determined based solely on the matched I/O pattern without having an association with a particular application.

The example 400 includes a set 410 of I/O patterns and corresponding configuration options. Element 410 may include an entry or row for each predetermined I/O pattern and associated configuration option(s). For example, entry 412 indicates that if the observed I/O pattern has an average I/O size of SMALL an at least 30% random writes, storage for the I/O operations should be stored on LUNs in a RAID-0 or RAID-1 group. In connection with 412, SMALL may be a threshold indicating a threshold size for I/Os which are considered small for use with techniques herein. SMALL may be one of a plurality of predefined relative categories of sizes for I/O operation size classification in accordance with techniques herein.

Entry 414 indicates that if the observed I/O pattern is less than 30% write operation and at least 30% of the I/O operations has an average I/O size of SMALL an at least 30% random writes, storage for the I/O operations should be stored on a LUN in a RAID-5 group. Entry 416 indicates that if an observed I/O rate (e.g., any one or more of the I/O metrics described herein) for a LUN is more than a defined threshold, the LUN should have its data stored in a particular storage tier. For example, if the number of I/Os/second for a LUN are more than a threshold amount indicating a HIGH level of I/O activity, the LUN should be stored on physical devices included in the SSD tier.

It should be noted that, for a single observed I/O pattern, an embodiment may provide for selecting and utilizing one or more qualifying entries of 410.

In addition to, or as an alternative to, analyzing the observed I/O operations, an embodiment in accordance with techniques herein may used hint information. As described below, hint information may be provided in-band and out-of-band. In-band hint information may be included with one or more I/Os sent on a data path and provide information about the I/O to which the hint information is included/attached. Out-of-band hints may be transmitted on the control path or management path (e.g., but not necessarily as a result of any user interaction) and may identify a particular data set (e.g. LUN, or file system). The hint information of the out-of-band hint may indicate, for example, that I/Os to that data set should be processed in a particular way (e.g. using identified parameters or values). Different out-of-band hints may be applicable to the same data set at different times providing a dynamic temporal aspect to the hint information. For example, there may be multiple different hints for a portion of storage, data set, and the like, where each hint is applicable at a different time of the day, week, or month.

Figure 8:
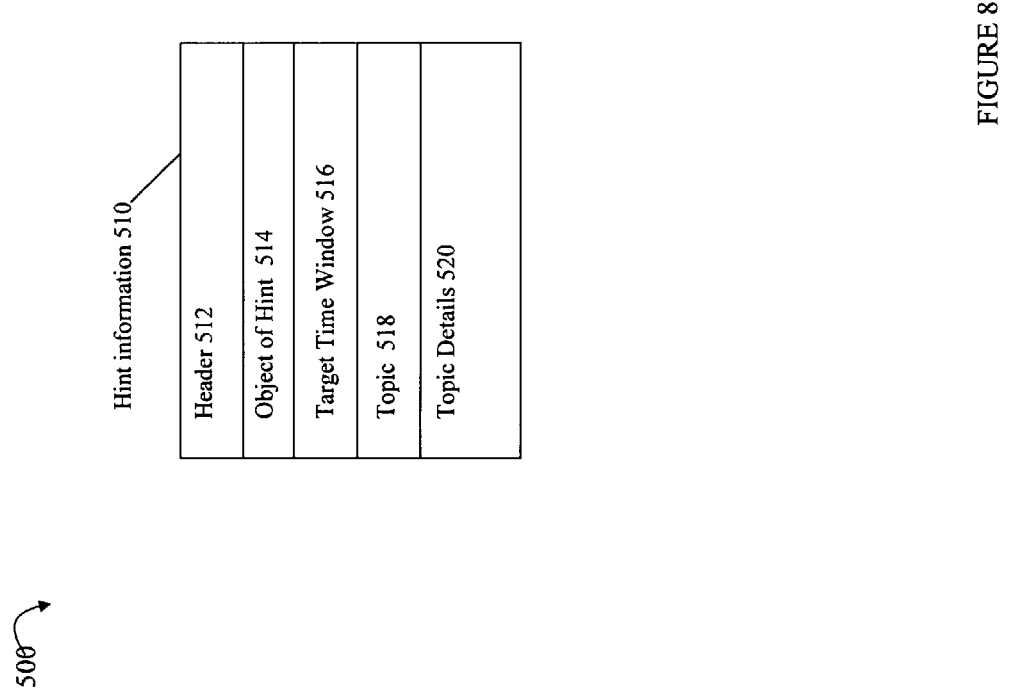
FIGS. 8, 9 and 10 are examples illustrating hint information that may used in an embodiment in accordance with techniques herein.

Referring to FIG. 8, shown is an example representation of hint information that may be used in an embodiment in accordance with techniques herein. The hint information described in connection with FIG. 8 and others herein may represent hint information for use with both in-band and out-of-band hints. In the example 500, the hint information 510 may include a header 512, identify an object of the hint 514, target time window 516, a topic 518, and topic details. The header 512 may, for example, identify the producer of the hint information, may include an expected probability (e.g., expressed as a percentage, where 0% is probability is a hint that an event described by the hint will not occur) that the hint describes an occurrence that will happen, and may include an importance indicator providing a level of importance of the hint information (e.g., on a scale such as from 1 through 100, inclusively, with 1 being least important and 100 being most important).

Element 514 may, more generally, identify one or more data storage entities to which the hint information is applicable. For example, 514 may identify an application, a storage set of one or more LUNs, a single LUN, another logical unit or partitioning of storage composed of multiple LUNs (e.g., such as a hypervolume) or a portion of a LUN, an I/O type (e.g., read, write), or a single I/O operation. Element 516 may identify a time period to which the hint information is applicable. For example, element 516 may identify a period of hours, days, minutes, and the like. Element 516 may also indicate that the hint information is instantaneously applicable to the current time and, for example, applicable to the current I/O operation to which the hint information is associated with in-band hints. Element 516 may indicate that the time period may recur. For example, element 516 may indicate a period of hours, minutes or portion of a day and may indicate that the time period is applicable to every day (e.g., recurs every day). Element 518 may indicate the topic of the hint such as in accordance with a defined hint classification. For example, element 518 may indicate that the hint relates to a workload or data. Element 520 may provide further details about the hint topic of 518 and may vary with the data of the hint topic 518. For example, if 518 indicates that the hint information relates to a workload, the topic details 520 may provide further information on the expected workload. For example, 520 may provide an indication as to the type and amount of I/Os of the expected workload (e.g., mostly reads or writes, one or more characteristics about the type of I/O operations such as may be related to size, intensity or rate). As another example, if 518 indicates that the hint relates to data, the topic details 520 may provide further information regarding the type of data (e.g., metadata, data security level, data sensitivity level, whether the data relates to personal information such as related to health, bank accounts, and/or social security number).

Figure 9:
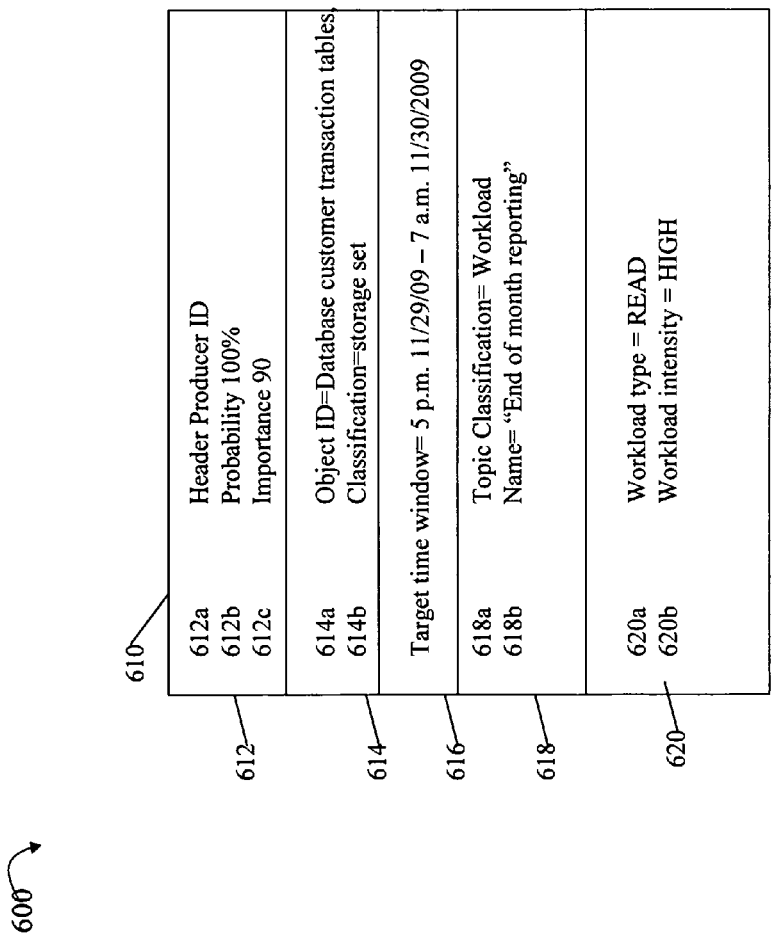

Referring to FIG. 9, shown is an example of hint information as may be included in an out-of-band hint. The hint information 610 may include elements 612, 614, 616, 618 and 620 containing information corresponding, respectively, to elements 512, 514, 516, 518 and 520 of FIG. 8.

The hint information 610 may include a header 612 identifying the producer of the hint information 612a, a probability 612b that the event described by the hint will occur, and an importance 612c. The hint information 610 may identify in 614 the entity to which the hint is applied. In an object-based implementation, the entity may be represented by an object identified by 614a having a type or classification indicated by 614b. In the example 600, 614 indicates that the hint information relates to a storage set for a database of customer transaction tables. The storage set may be, for example, a set of one or more LUNs. The hint information 610 may identify in 616 a window of time as to when the hint information is applicable (e.g., p.m. Nov. 29, 2009-7 a.m. Nov. 30, 2009). The hint information 610 may identify in 618 that the hint relates to workload 618a associated with end of month reporting 618b. The hint information 610 may identify in 620 that the workload is expected to be highly read intensive. Element 620a may indicate the type of I/O operation of the workload as READ. Element 620b may indicate that the intensity has a HIGH workload, wherein HIGH may be one of a plurality of predefined intensity levels. Each such level may be associated with one or more thresholds configured for a particular embodiment.

Figure 10:
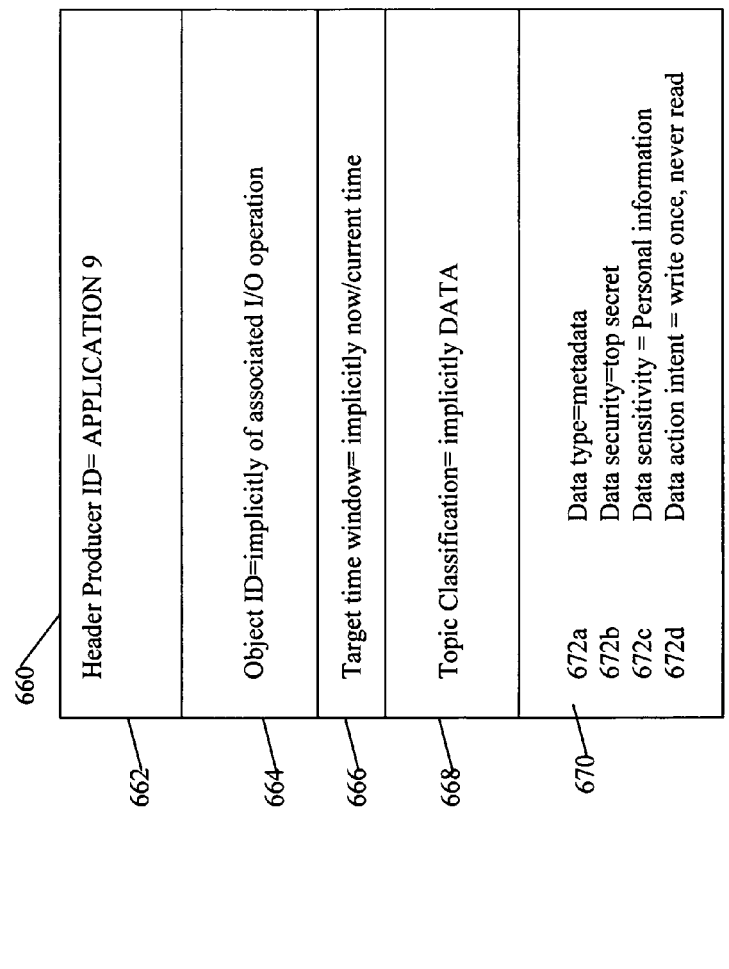

Element 614 may identify a storage set which includes one or more LUNs in accordance with an existing definition for the storage set on the data storage system. An embodiment in accordance with techniques herein may search for an I/O pattern of the table 410 which matches that identified in the hint to determine one or more configuration options for the LUNs of the storage set. For example, based on the information included in 6616, 618 and/or 620, data of the one or more LUNs identified by 614 may be temporarily moved for the duration indicated by the time window 616 from storage devices of a first storage tier to storage devices of a second storage tier where the second storage tier devices having higher performance characteristics than those of the first storage tier (e.g. moved from FC disk drives to SSD drives. In preparation for the foregoing the affected data may be temporarily moved to the SSD drives prior to the time period and then moved back to the FC drives after the time period has lapsed. As another use of the hint information of 610, element 614 may identify (implicitly or explicitly) the application to which the hint is applicable. For example, the object ID of 614b may implicitly be associated with a type of application (e.g., database or email), a particular instance of a database application (e.g., an Oracle database application, a Microsoft database application), a particular instance of an email application (e.g., Microsoft Exchange), and the like. In this case, the hint information 610 may be associated with the application indicated by 614. For example, if 614 indicates the hint information 610 applies to a particular email application, the table 110 of FIG. 4 may be searched for a corresponding application entry and the configuration options of that entry applied to the storage set also identified in 614 of the hint information. Thus, an out-of-band hint may identify both an application and a portion of storage (e.g., one or more LUNs) used by the application Referring to FIG. 10, shown is an example of hint information as may be included in an in-band hint. The hint information 660 may include elements 662, 664, 666, 668 and 670 containing information corresponding, respectively, to elements 512, 514, 516, 518 and 520 of FIG. 8. The hint information 660 may include a header 662 identifying the producer of the hint information. The hint information 660 is produced by the application which issued the associated I/O operation and is accordingly identified by 662. The hint information 660 may identify in 664 the entity to which the hint is applied. In this example with in-band hints, the hint information may be implicitly applied to the associated I/O operation to which the hint information is attached or included in. For example, if the hint information 660 is associated with an I/O operation that writes to LUN X, the hint information may characterize data to be written by the I/O operation and may affect attributes of the LUN X, storage pool including LUN X, whether a particular data service such as encryption or compression is performed for LUN X data, and the like. The hint information 660 may identify in 666 a window of time as to when the hint information is applicable which, is implicitly now or the current time for the I/O operation. The hint information 660 may identify in 668 that the hint relates to data. The hint information 660 may identify in 670 that the data of the I/O operation is metadata 672a, has a top secret data security level 672b, has a data sensitivity level associated with personal information 672c, and is expected to be written once and never written. It should be noted that data values associated with 672a-672d may be predefined classifications in an embodiment. The information of 670 may generally indicate that the information of the I/O operation, and thus the LUN to which the data is written may contain data of a high security and high sensitivity level.

Element 662 may identify an application such as APPLICATION 9. An embodiment in accordance with techniques herein may determine whether there is a match for APPLICATION 9 in the table 110 of FIG. 1 including customized configuration options. If so, the matching entry of table 110 for APPLICATION 9 may include configuration options used in connection with data storage for APPLICATION 9. For example, if the I/O operation associated with the in-band hint information 660 is directed to LUN X, the data storage system may perform data storage configuration processing for LUN X as indicated by the configuration options of the matching entry. As another use of the hint information 660, one or more fields of 660, such as information in 668 and/or 670, may be used to identify an I/O pattern. In the event that the application indicated by 662 does not having a matching entry in table 110 of FIG. 1, the information of 668 and/or 670 may be used to form an I/O pattern which may be matched against table 410 of FIG. 7. If a matching entry in 410 is found, the configuration options of the matching entry may be used in connection with data storage configuration for the LUN X to which the I/O operation associated with the hint information 660 is directed. For example, the information of 670 may match an I/O pattern of an entry in 410 having associated configuration options indicating, for example, to encrypt the data and to store the data on a device of a low performance tier (e.g., such as ATA devices, tape devices, and the like. Since this data is written once and never read, subsequent access is not a concern).

In connection with some embodiments, one or more applications may executed in a virtualized environment. For example, an embodiment may have one or more virtual machines executing on a single physical machine in a virtualized environment using virtualization software produces by VMware, Inc. In the context of each virtual machine, one or more virtual applications may be executed, where the virtual applications may include, for example, an email application such as Microsoft Exchange, or a database application. The virtual application may issue an I/O operation to the data storage system where the data or I/O path includes the VMware stack. In this case, the I/O operation request and also the in-band hint may identify the application as "VMware" or other virtualization software, rather than the virtual application. For example, the in-band hint information may identify VMware as the hint producer in the header. In connection with techniques herein, it may be desirable to identify the virtual application (e.g., the email or database application) which issued the I/O operation and/or hint information. In connection with an I/O operation, it may be determined that VMware is the issuing application or initiator. In one embodiment in accordance with the SCSI protocol, logical names such as world-wide names (WWNs) may be associated with initiator ports of a host. Such names may also be known as iSCSI qualified names (IQNs). Furthermore, the data storage system may know that VMware is the initiator with respect to one or more WWNs over which VMware issues I/O operations to the data storage system. Such information may be obtained as a result of executing suitable data storage system management commands and providing the data storage system with this information. A subsequently issued I/O operation in accordance with a SCSI standard may include the WWN of the initiator port. Thus, based on the foregoing WWN-VMware association and the I/O operation-WWN association, the data storage system may determine which received I/O operations are from VMware. The data storage system may then issue commands via a define API (application programming interface) to communicate with VMware and inquire regarding the virtual application which issued the I/O operation directed to a particular LUN from the initiator port. An embodiment may then use the virtual application identified in connection with the techniques described herein.

As an exemplary use of techniques herein, a data storage system may be shipped with a set of default configuration options. At startup prior to using the data storage system for storing application data, a portion of the physical devices may be configured automatically using the default configuration options. As applications perform I/Os to LUNs, the techniques herein may be utilized to analyze I/O patterns, determine the application issuing the I/O operation, use hint information, and the like. In response, an embodiment may then configure additional physical storage devices having configuration options selected for the analyzed I/O pattern, determined application, and/or hint information. As appropriate, the data storage system may then migrate existing data to the newly configured devices. The foregoing may be performed automatically in an embodiment in accordance with techniques herein without user interaction.

As another example, an embodiment may initially configure two storage pools SP1 and SP2 and may store an application's data on devices of SP1. Through analysis of subsequent I/O operations (alone or in conjunction with in-band hint information) from the application, the data storage system may determine that SP2 may have attributes more suitable for use with the application's data. In response, the data storage system may automatically migrate the application's data from SP1 to SP2. Alternatively, in response, the data storage system may automatically configure additional physical devices having more suitable attributes and then migrate the application's data from SP1 to these newly configured devices. The newly configured devices may be configured, for example, as part of SP1 (e.g. automatically added to SP1), may be configured as a new additional SP3.

In connection with techniques herein, an embodiment may use information obtained from hints (in-band and/or out-of-band) and/or I/O path analysis to determine the application (or type of application such as a database application or email application) and perform data storage configuration based on the application and/or type. Based on the application, application type and/or I/O pattern, customized data storage configuration options may be selected and used to select and/or configure storage (e.g., select currently configured storage, configure additional devices, and/or reconfigure currently configured storage).

If a data storage system configured for automated storage management has an amount of free or unused storage capacity that falls below a threshold level, the techniques herein may be used to automatically determine suitable configuration options based on historical usage by one or more applications and may automatically configure additional storage devices to a storage pool, RAID group, and the like, in accordance with the suitable configuration options. In connection with techniques herein, an embodiment may determine the portions of storage (e.g., LUNs) used by an application. If the application has a predetermined set of additional configuration options customized for the application, these additional configuration options may also be used for the application (e.g., to determine or modify data protection schedules such as automate determination of a snapshot, backup or replication schedule based on application best practices where the options are customized for the application.

The techniques herein are adaptable and flexible. For example, if an application's data usage changes over time or new applications also use the data storage system, the techniques herein may provide for automatically adapting the configuration of the data storage system for these changes. As another example, an amount of storage capacity used for data protection (e.g., snapshots, replication, and the like) may be automatically increased in proportion to the number of observed writes. A backup schedule or other frequency parameter related to data protection may be determined based on the number of write operations performed.

An embodiment may also select a particular file system (e.g., Unix-based file system, NTFS) determine one or more file system attributes, determine whether to use block-based storage, and the like as part of automatically determining configuration options for use with storage configuration. Based on observed I/O access patterns or expected I/O patterns indicated in hint information, one or more data storage options may be automatically determined and used to configure new storage device and/or modify existing storage configurations. For example, if data is written infrequently but read a lot, one storage tier, RAID group configuration and the like may be selected. If data is not accessed frequently (e.g. not read or written frequently in accordance with a defined threshold) then the data may be located on a lower performance storage tier.

In addition to the above, following are types of applications, I/O patterns, and best RAID layouts as may be described using application profile information. RAID I/O may be characterized as providing good performance on workloads that use very small, random, and write-intensive I/O. A write-intensive workload's operations consist of, for example, greater than 30 percent random writes. Some examples of application types with random, small I/O workloads are on-line transaction processing (OLTP) systems (e.g., large messaging installations, real-time data systems, relational database management systems (RDBMS) having data tables containing small records that are updated frequently (e.g. banking application with respect to account balances). RAID 5 may be selected for messaging, data mining, medium-performance media serving, and RDBMS implementations in which may, for example, effectively use read-ahead (e.g., prefetch data) and write-behind techniques. If the host operating system and HBA are capable of greater than 64 KB transfers, RAID 5 is a compelling choice. The following application may store data on devices of a RAID-5 group: random workloads with modest IOPS (IOs/scond)-per-gigabyte requirements, high performance random I/O where writes are less than 30 percent of the workload, a database in which access is sequential (e.g., performing statistical analysis on sales records), an RDBMS tablespace where record size is larger than 64 KB and access is random (e.g., personnel records with binary content, such as photographs), RDBMS log activity, messaging applications, and applications storing and/or otherwise using video or multimedia data.

An embodiment may also utilize many other techniques to generally automate other aspects of data storage configuration such as automatically configuring ports of the data storage system.

Figure 11:
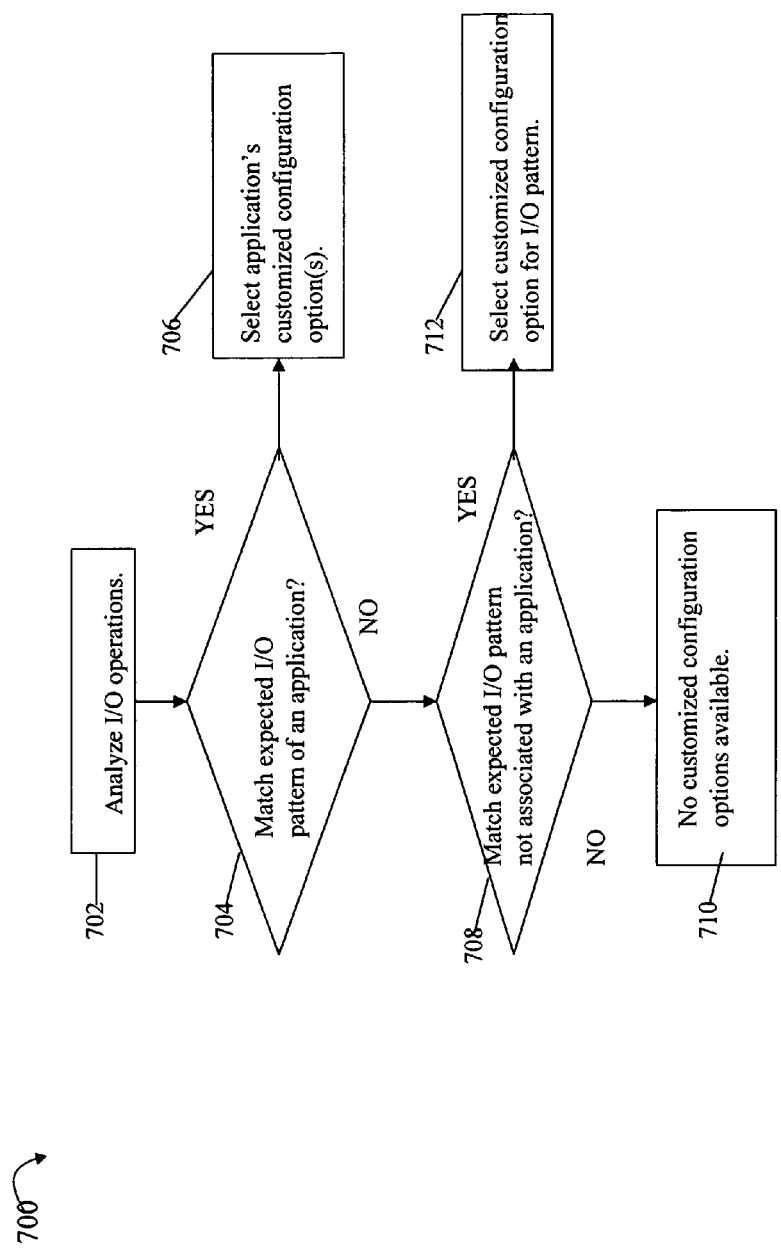
FIGS. 11, 12 and 13 are flowcharts of processing steps that may be performed in an embodiment in accordance with techniques herein.
Figure 12:
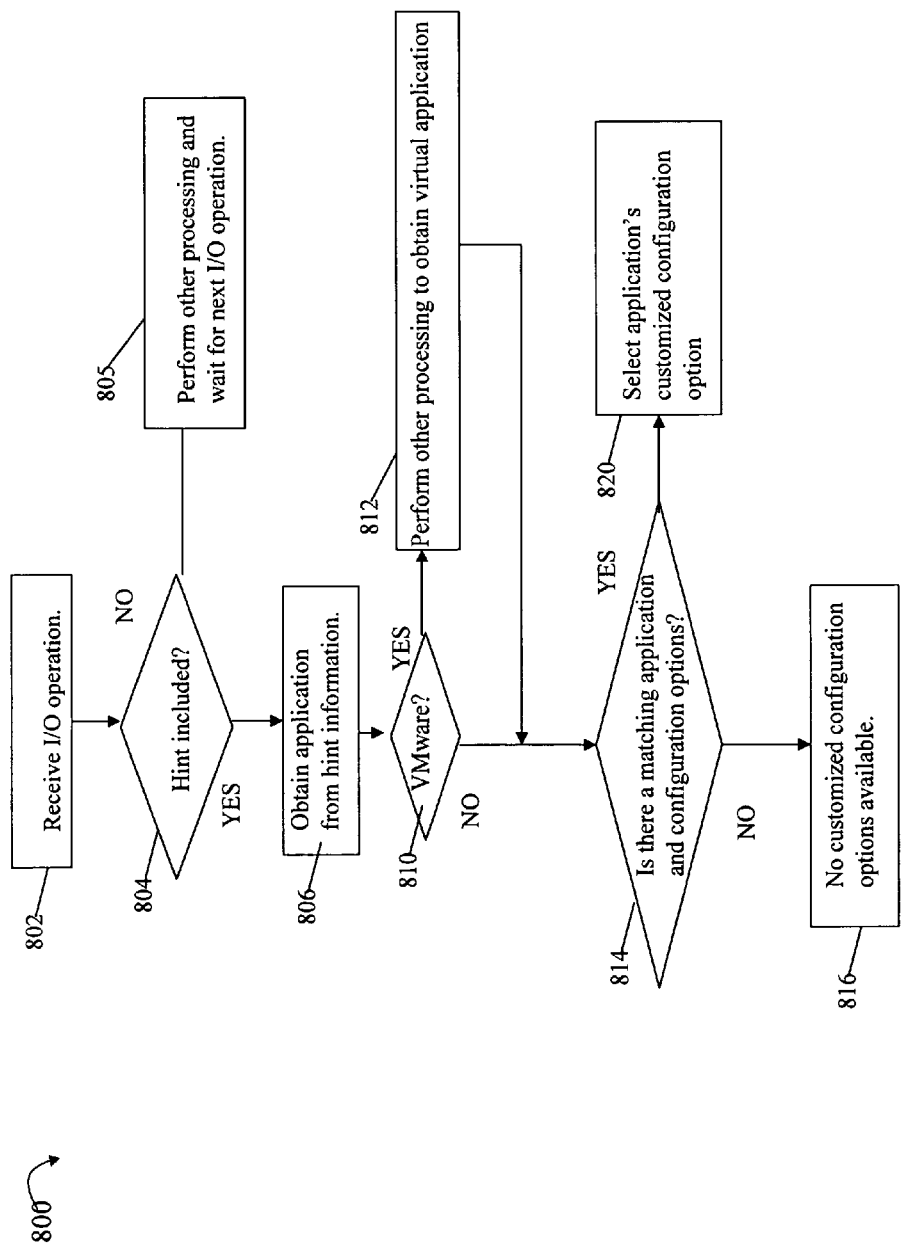
Figure 13:
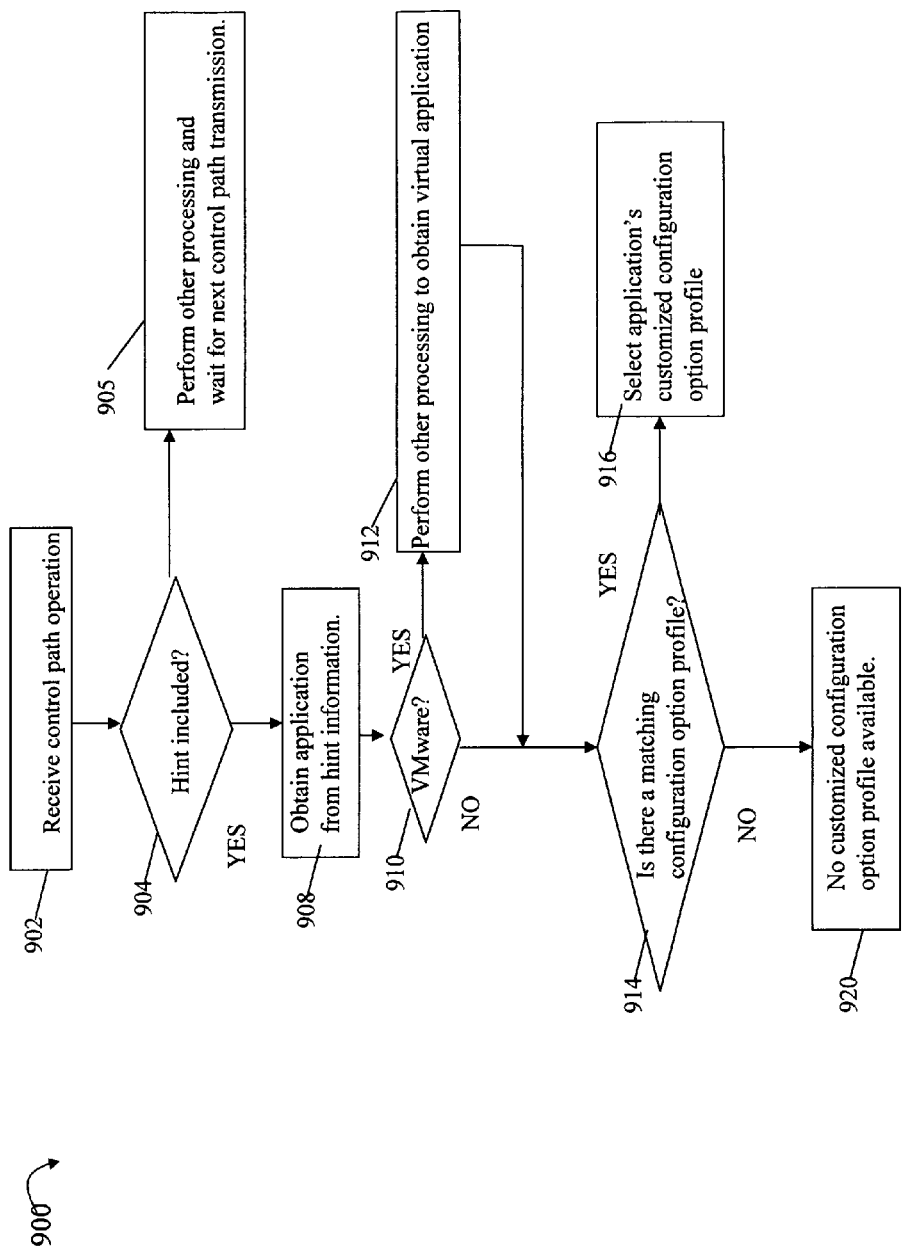

What will now be described in connection with FIGS. 11, 12, and 13 are processing steps that may be performed in an embodiment in accordance with techniques herein. These flowcharts summarize processing described above.

Referring to FIG. 11, shown is an example of processing that may be performed in an embodiment with respect to received I/O operations. At step 702, the received I/O operations may be analyzed as described herein to obtain an observed I/O pattern. At step 704, a determination is made as to whether the observed I/O pattern matches an expected or predetermined I/O pattern of an application. If step 704 evaluates to yes, control proceeds to step 706 to select the application's customized configuration option(s). Step 704 may include selecting an entry from the table 110 of FIG. 4 and using the configuration options of the selected entry. If step 704 evaluates to no, control proceeds to step 708 where a determination is made as to whether the observed I/O pattern matches a different type of expected I/O pattern which is not associated with an application/application type. If step 708 evaluates to yes, control proceeds to step 712 to select the customized configuration options(s) based on the matching I/O patterns. Step 712 may include selecting an entry from the table 410 of FIG. 7 and using the configuration options of the selected entry. If step 708 evaluates to no, control proceeds to step 710 where no customized configuration options may be used.

Processing of FIG. 11 may be performed, for example, with the occurrence of a predetermined time period to process information about I/O received during the time period.

Referring to FIG. 12, shown is another example of processing that may be performed in an embodiment with respect to received I/O operations. Flowchart 800 describes processing of a single I/O operation and an in-band hint as may be performed in an embodiment in accordance with techniques herein. At step 802, an I/O operation is received. At step 804, a determined is made as to whether the I/O operation includes in-band hint information. If step 804 evaluates to no, control proceeds to step 805 to perform other processing of the current I/O operation and wait for the next received I/O operation. If step 804 evaluates to yes, control proceeds to step 806 to obtain the application from the in-band hint information. As described above, this may be extracted from the header of the hint information. At step 810, a determination is made as to whether the application is indicated as VMware, or more generally, another application other than the one which issued the I/O operation received at step 802.1f step 810 evaluates to yes, control proceeds to step 812 to perform other processing to obtain the virtual application, or more generally, the application that actually issued the I/O operation. From step 812, control proceeds to step 814. If step 810 evaluates to no, control also proceeds to step 814. At step 814, a determination is made as to whether there is a matching application for which customized configuration option have been predetermined. If step 814 evaluates to yes, control proceeds to step 820 to select the matching application's customized configuration options. Step 820 may result in selecting a matching entry of table 110 of FIG. 4 and using the entry's configuration options. If step 814 evaluates to no, control proceeds to step 816 where it may be determined that no customized configuration options are available for use. Alternatively, an embodiment may perform other processing as described above in connection with step 814.

Referring to FIG. 13, shown is another example of processing that may be performed in an embodiment in accordance with techniques herein. Flowchart 900 describes processing of out of band hint information as may be received on the control or management path. At step 902, a transmission may be received on the control or management path. At step 904, a determination is made as to whether the received transmission includes an out-of-band hint. If step 904 evaluates to no, control proceeds to step 905 to perform other processing and wait for the next received control path transmission. If step 904 evaluates to yes, control proceeds to step 908 to obtain the application from the out-of-band hint information. Processing of remaining steps 910, 912, 914, 916 and 920 is analogous respectively to steps 810, 812, 814, 820 and 816 of FIG. 13.

It should be noted that, as described above, rather than identify an application using the out-of-band hint information, the in-band hint information may identify one or more LUNs or other portion of storage without identifying the application. In this case, the I/O pattern indicated by the hint may be used to possibly determine a matching predetermined I/O pattern such as of table 410 of FIG. 7 and use configuration options associated with the matching predetermined I/O pattern.

An embodiment may implement the techniques herein using code executed by a processor. For example, an embodiment may implement the techniques herein using code which is executed by a processor of the data storage system, or more generally any other system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for performing automated data storage configuration comprising:
   receiving a plurality of I/O (input/output) operations on a data path;
   analyzing said plurality of I/O operations and determining analysis information;
   determining, in accordance with said analysis information, an application which issued the plurality of I/O operations;
   determining one or more configuration options customized in accordance with the application; and
   configuring a portion of data storage in a data storage system for use by the application in accordance with the one or more configuration options, and wherein hint information is provided in any of a data storage configuration command over a control path and at least a first of the plurality of I/O operations, said hint information being used in connection with said configuring a portion of data storage for use by the application.

2. Time method of claim 1, further comprising:
   selecting an application profile of customized configuration options for the application based on the analysis information, wherein said application profile includes said one or more configuration options used in said configuring.

3. The method of claim 1 wherein each of the plurality of I/O operations includes hint information, identifying said application.

4. A method for performing automated storage configuration comprising:
   receiving a plurality of I/O (input/output) operations on a data path;
   analyzing said plurality of I/O operations and determining analysis information;
   determining, in accordance with said analysis information, an application which issued the plurality of I/O operations;
   determining one or more configuration options customized in accordance with the application; and
   configuring a portion, of data storage in a data storage system for use by the application in accordance with the one or more configuration options, wherein each of the plurality of I/O operations includes hint information, the hint information including information identifying said application, wherein said hint information includes a window of time indicating when said application is expected to perform I/O activity identified in the hint information.

5. The method of claim 3, wherein said hint information of each of the plurality of I/O operations includes information characterizing data of said each I/O operation.

6. The method of claim 5, wherein said hint information of each of the plurality of I/O operations includes any of a type of data, a security indicator, a data sensitivity indicator, and a data usage indicator.

7. A method for performing automated data storage configuration comprising:
   receiving a plurality of I/O (input/output) operations on a data path;
   analyzing said plurality of I/O operations and determining analysis information;
   determining, in accordance with said analysis information, an application which issued the plurality of I/O operations;
   determining one or more configuration options customized in accordance with the application; and,
   configuring a portion of data storage in a data storage system for use by the application in accordance with the one or more configuration options, and the method further comprising:
   selecting an application profile of customized configuration options for the application based on the analysis information wherein said application profile includes said one or more configuration options used in said configuring, wherein said application profile includes information identifying one or more customized configuration options including any of a RAID (redundant array of independent disks) protection level, a RAID layout configuration including a number of data members and parity members, one or more data storage tiers to be used in connection with storing data for the application, an indicator as to whether data for the application may be automatically migrated between storage tiers, an indicator as to whether to data for the application is stored on a thin device, an indicator as to whether to perform compression when storing data of the application, an indicator as to whether to perform encryption when storing data of the application, and an indicator as to whether to perform deduplication when storing data of the application.

8. The method of claim 7, wherein the application profile includes information regarding data protection and indicates any one or more of a protection schedule and a technology for providing data protection.

9. The method of claim 8, wherein said technology for providing data protection includes any of a snapshot, device cloning or replication, and remote data replication.

10. A method for performing automated data storage configuration comprising:
    receiving a plurality of I/O (input/output) operations on a data path;
    analyzing said plurality of I/O operations and determining analysis information;
    determining, in accordance with said analysis information, an application which issued the plurality of I/O operations;
    determining one or more configuration options customized in accordance with the application; and
    configuring a portion of data storage in a data storage system for use by the application in accordance with the one or more configuration options, wherein the method further comprises:
    determining, for a defined time period, one or more mettles regarding said plurality of I/O operations;
    determining, in accordance with said one or more metrics, an observed I/O pattern; and
    determining that said application issued the plurality of I/O operations based on the observed I/O pattern.

11. The method of claim 10, wherein the observed I/O pattern matches a predetermined I/O pattern expected for the application.

12. The method of claim 10, wherein said one or more metrics including any of a total number of I/O operations/time period, a number of read operations/time period, a number of write operations/time period, a ratio of read to write operations, an average size of an I/O operation determined for a time period, an average size of a read operation determined for a time period, and an average size of a write operation determined for a time period.

13. The method of claim 1, wherein said method is performed by code executing in the data storage system without any user interaction.

14. A method for performing automated data storage configuration comprising:
   receiving a plurality of I/O (input/output) operations on a data path;
   analyzing said plurality of I/O operations and determining analysis information;
   determining, in accordance with said analysis information, an application which issued the plurality of I/O operations;
   determining one or more configuration options customized in accordance with the application; and
   configuring a portion of data storage in a data storage system for use by the application in accordance with the one or more configuration options wherein hint information is sent to the data storage system over a control path in a data storage configuration command, said hint information including information identifying a second application, a portion of data storage to which the hint information applies, a target window of time as to when the hint information applies, a hint classification, and hint details.

15. The method of claim 14, wherein the hint classification identifies an expected workload and the hint details identifying workload characteristics including any of type of I/O operation and expected intensity level.

16. A non-transitory computer readable medium comprising code stored thereon for performing automated data storage configuration, the computer readable medium comprising code, which when executed, performs a method comprising:
   receiving a plurality of I/O (input/output) operations on a data path;
   analyzing said plurality of I/O operations and determining analysis information;
   determining one or more configuration options customized in accordance with the analysis information; and
   configuring a portion of data storage in a data storage system for use in accordance with the one or more configuration options, and wherein hint information is provided in any of a data storage configuration command over a control path and at least a first of the plurality of I/O operations, said hint information being used in connection with said configuring a portion of data storage for use by an application.

17. A non-transitory computer readable medium comprising code stored thereon for performing automated data storage configuration, the non-transitory computer readable medium comprising code, which when executed, performs a method comprising:
   receiving a plurality of I/O (input/output) operations on a data path;
   analyzing said plurality of I/O operations and determining analysis information;
   determining one or more configuration options customized in accordance with the analysis information; and
   configuring a portion of data storage in a data storage system for use in accordance with the one or more configuration options, wherein the method further comprises:
   determining, for a defined time period, one or more metrics regarding said plurality of I/O operations;
   determining, in accordance with said one or more metrics, an observed I/O pattern in accordance with one or more of an I/O operation type, an I/O operation frequency, and an I/O operation size; and
   determining said one or more configuration options based on the observed I/O pattern.

18. The non-transitory computer readable medium of claim 17, wherein the one or more configuration options include any of a RAID (redundant array of independent disks) protection level, a RAID layout configuration including a number of data members and parity members, one or more data storage tiers to be used in connection with storing data used in connection with the plurality of I/O operations.

19. A method for performing automated data storage configuration comprising:
   receiving a plurality of I/O (input/output) operations on a data path;
   analyzing said plurality of I/O operations and determining analysis information;
   determining, in accordance with said analysis information, an application which issued the plurality of I/O operations;
   determining one or more configuration options customized in accordance with the application; and
   performing, in accordance with the one or more configuration options, an action in connection with data storage configuration, and wherein hint information is provided in any of a data storage configuration command over a control path and at least a first of the plurality of I/O operations, said hint information being used in connection with said action to configure a portion of data storage for use by the application.

20. The method of claim 19, wherein said action includes any of providing one or more input parameters to a software module that performs automated storage tiering management including data migration between different defined storage tiers, and creating a data protection schedule using a data protection service identified in the one or more configuration options.

* * * * *